United States Patent [19]

Colyer

[11] 4,456,643
[45] Jun. 26, 1984

[54] DECORATIVE LAMINATE

[75] Inventor: Timothy D. Colyer, Columbia, Pa.

[73] Assignee: Armstrong World Industries, Inc., Lancaster, Pa.

[21] Appl. No.: 403,032

[22] Filed: Jul. 29, 1982

[51] Int. Cl.³ .......................... B32B 3/00; B32B 5/16
[52] U.S. Cl. ................................ 428/156; 428/159; 428/201; 428/204; 428/206; 428/207; 428/318.6; 428/327; 428/403; 428/518
[58] Field of Search ............. 428/403, 206, 201, 207, 428/518, 327, 204, 318.6, 156, 159; 427/198, 264; 156/62.4; 162/145, 168.1

[56] References Cited

U.S. PATENT DOCUMENTS

| | | | |
|---|---|---|---|
| 3,000,754 | 9/1961 | Zentmyer | 428/206 |
| 3,121,642 | 2/1964 | Biskup | 427/199 |
| 3,980,511 | 9/1976 | Proucelle | 156/62.4 |
| 4,018,647 | 4/1977 | Wietsma | 162/168.1 |
| 4,126,727 | 11/1978 | Kaminski | 428/159 X |
| 4,217,385 | 8/1980 | Shortway et al. | 428/159 |
| 4,234,379 | 11/1980 | Conway et al. | 162/145 |
| 4,298,646 | 11/1981 | Haemer et al. | 428/206 X |
| 4,409,280 | 10/1983 | Wiley et al. | 428/159 X |

*Primary Examiner*—Thomas J. Herbert, Jr.

[57] ABSTRACT

A decorative laminate having a differential texture and a differential gloss, and a method of manufacture therefor, are provided wherein the laminate has an embossed surface comprising raised segments which contain PVC resin particles adjoining recessed segments which do not contain PVC resin particles whereby the raised and recessed segments impart a relief pattern on the surface of the decorative laminate, and the raised segments have a rougher surface texture and a lower gloss than the recessed segments. The decorative article is useful as a floor covering.

32 Claims, 3 Drawing Figures

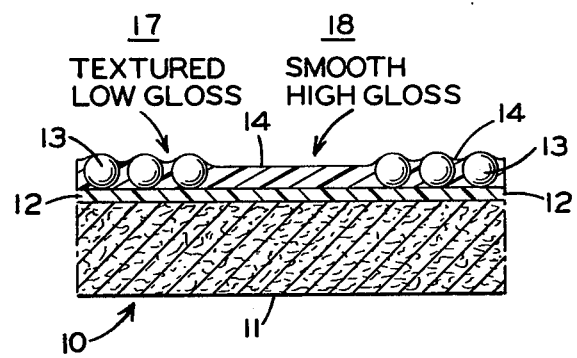
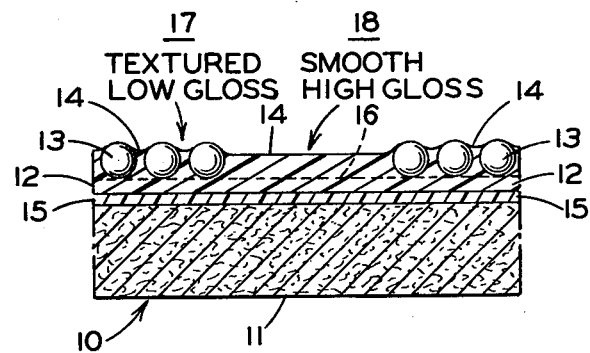
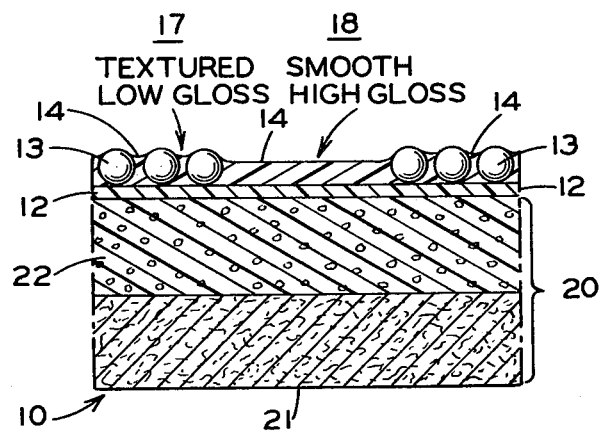

DECORATIVE LAMINATE

FIELD OF THE INVENTION

The present invention relates to decorative laminates that are suitable as surface coverings for floors, walls, etc., and, more particularly, is directed to a decorative laminate having differential surface texture and differential surface gloss features.

BACKGROUND OF THE INVENTION

Generally speaking, decorative laminates useful as surface coverings for floors are well-known in the art and have achieved broad use in both domestic and commercial environments. For example, decorative laminates in the form of sheet material of a resinous polymer composition, e.g., polyvinyl chloride, on a suitable substrate, e.g., a fibrous backing sheet, have been used for many years as sheet flooring. A goal common to all manufacturers of sheet flooring is to provide flooring products having appealing surface decorative effects that are both attractive from an aesthetic viewpoint and useful from a functional standpoint. To illustrate, many methods and processes such as mechanical embossing, chemical embossing or inlaying have been utilized to provide contrasting surface finishes and thereby impart decorative effects to the sheet flooring. For example, U.S. Pat. Nos. 3,000,754; 3,121,642 and 4,298,646 each discloses different techniques or means for making floor covering products such as floor tiles or sheet flooring having decorative surface effects.

SUMMARY OF THE INVENTION

According to the present invention there is provided a decorative laminate having an embossed surface of differential surface texture and differential surface gloss suitable as a floor covering comprising a substrate optionally having a printed image thereon; PVC resin particles adhered to said substrate so constructed and arranged as to provide raised segments containing said PVC resin particles adjoining recessed segments which do not contain said PVC resin particles whereby said raised and recessed segments impart a relief pattern on the surface of said decorative laminate; and a layer of transparent synthetic organic polymer adhered to the surface of said raised segments and said recessed segments; whereby the raised segments of said decorative laminate exhibit a rougher surface texture and a lower gloss than the recessed segments of said decorative laminate.

According to the present invention there is further provided a method for making a decorative laminate having differential surface texture and differential surface gloss suitable as a floor covering, said method comprising applying to a substrate material a vinyl plastisol composition to overly said substrate and any printed image on said substrate; applying a layer of PVC resin particles over said vinyl plastisol composition on the surface of said substrate; heating said substrate to gel said vinyl plastisol thereon and thereby firmly adhere said PVC particles to said vinyl plastisol; forming a top resinous layer on said PVC resin particles by applying a transparent synthetic organic polymer over said PVC resin particles; heating the resulting top resinous layer thereby to provide a fused decorative laminate; and embossing said decorative laminate to provide a relief pattern on the surface thereof characterized by raised segments having said PVC resin particles and recessed segments not having said PVC resin particles, whereby the raised segments of said decorative laminate overlying said PVC resin particles exhibit a rougher surface texture and a lower gloss than the recessed segments of said decorative laminate.

BRIEF DESCRIPTION OF THE DRAWINGS

In the accompanying drawings:

FIG. 1 is a cross-sectional view depicting the arrangement of elements and structural features of the decorative laminate of the invention;

FIG. 2 is a cross-sectional view of another embodiment of the decorative laminate of the invention having a printed image on the substrate interposed between the substrate and the polyvinyl chloride resin particles; and FIG. 3 is a cross-sectional view of another embodiment of the decorative laminate of the invention having a base layer of different construction than that shown in FIGS. 1 and 2.

DETAILED DESCRIPTION OF THE INVENTION

Referring to FIGS. 1 and 2, which disclose preferred embodiments, the decorative laminate 10 of the invention comprises a substrate member 11 which is often referred to as a base layer or backing sheet. The substrate member or element 11 bears a layer 12 of vinyl plastisol composition. Particles of polyvinyl chloride (PVC) resin 13 are disposed on and secured to the layer 12 of vinyl plastisol composition and are arranged or distributed thereon in any desired pattern. A top layer 14 of transparent synthetic organic polymeric material overlies both PVC resin particles 13 and the regions above substrate 11 that are intermediate the PVC particles and which do not contain the PVC resin particles. Layer 14 of laminate 10 is often referred to as a "wear layer" when the laminate is used as a floor covering. The decorative laminate of the invention as shown in FIG. 1 is of unitary construction wherein the elements or components thereof described hereinabove have been fused by heat in accordance with the method described hereinafter.

The decorative laminate 10 depicted in FIG. 2 differs from that shown in FIG. 1 by including a printed image 15 on the surface of substrate member 11. In this embodiment, the layer 12 of the vinyl plastisol composition extends over both the printed image 15 and the surface of substrate member 11 that is intermediate the printed image 15 thereon. An interrupted line 16 is shown in FIG. 2 to illustrate the continuous top surface of layer 12 which would exist prior to applying PVC resin particles 13 thereto and prior to fusing and consolidating the elements of the decorative product in the manner herein provided.

The regions 17 of decorative laminate 10 include PVC resin particles 13 and extend higher than adjacent regions 18 which do not contain PVC resin particles 13. Thus, the surface of decorative laminate 10 is characterized by a relief pattern having raised segments 17 which include PVC resin particles 13 and, also, recessed segments 18 which do not contain the PVC resin particles.

The elements of decorative laminates 10 will be described individually herebelow in conjunction with a description of the method for combining these elements to make the decorative laminates.

THE SUBSTRATE

The decorative laminate 10 is formed on a substrate or backing sheet 11 of strong, durable and flexible material. The flexible backing can be woven, felted or a solid sheet of synthetic or natural material. The conventional flexible backing is a web of felted fibers. The felt generally is produced using a Fourdrinier or cylinder paper machine with the thickness of the resulting sheet being that usually used in floor and wall covering, that is, from 0.02 to 0.08 inch. A thickness of about 0.032 inch is usually preferred. The fibrous material used is normally cellulose or asbestos in origin, although other fibers can be used including those of mineral and animal origin. The sources of cellulosic material can include cotton or other rag material, wood pulp including both ground wood and chemical wood pulp, paper, boxes, or mixtures thereof in any proportion. The web can also contain fillers, such as wood flour.

The felt can be strengthened and improved in water resistance by impregnation with a bituminous material. Numerous bituminous materials are well-known as impregnants in the production of printed surface coverings and include asphalts of petroleum or natural origin and tars and pitch residues of animal or vegetable origin. These materials can be treated to attain the desired physical properties of softening point or viscosity for satisfactory use by such treatment as air blowing, steam distillation and the like.

The impregnant should be uniformly dispersed throughout the felt sheet. This can be controlled to some extent by the saturating technique through use of pressure rolls in the saturating bath. Where the impregnant is not uniformly dispersed throughout, blistering can frequently occur due to high concentrations of material adjacent to one surface of the felt.

Other impregnants for the fibrous sheet can also be used to form backing sheets for use in the production of printed surface coverings in accordance with the invention. Such materials as phenolformaldehyde and phenol-urea resins, polymerized vinyl compounds, such as polyvinyl chloride, polyvinyl acetate and the like, cellulose acetate, cellulose nitrate, butadiene-styrene copolymer, butadiene acrylonitrile copolymer, natural rubber and the like can be used. Polymerizable materials can also be incorporated into the felt and the sheet subjected to heat to cure and polmerize the material. Such materials as natural and synthetic drying oils, mixtures of polyhydric alcohols and polybasic acids which cure to form polyesters, mixtures of polyhydric alcohols and polyisocyanates which cure to form urethane polymers, and the like can be used.

If an impregnated backing sheet is used, it usually is provided with one or more seal coats prior to printing the decorative design. The seal coats perform the desirable function of masking the color of the felt and preventing the impregnant from bleeding through and staining the wear layer and, in addition, create a smooth uniform surface suitable as a base for printing. Felt sheets of the type commonly used as backings for printed surface coverings tend to have minor surface irregularities due to non-uniformities in the felt-making equipment. The sheet also frequently shows a number of small protruding lengths of fibers. The seal coats are designed to hide all these irregularities. The total thickness of seal coats required is normally from about 1 to about 12 mils. This thickness can be created through use of a single thick coating or several superimposed thinner coatings. Using the conventional techniques of coating, such as flexible doctor roller application, the desired thickness is created by use of more than one coating. The use of multiple coatings is also desirable in promoting optimum adhesion of the wear surface layer to the backing, since the seal coat applied directly to the fibrous backing can be designed for optimum sealing against migration of bituminous impregnant and the uppermost seal coat can be designed for optimum adhesion to the polyvinyl chloride wearing surface layer.

The seal coat is conveniently applied in the form of an aqueous emulsion of resinous binder and filler. In the preparation of the seal coat, a resinous binder and filler are emulsified in water in the presence of conventional wetting agents, thickening agents, anti-foam agents, sequestering agents and the like. After the application of the seal coat to the backing sheet, the coating is dried by subjecting the sheet to heat, as for example, in the range of about 100° F. to about 150° F. for about 30 minutes to about 2 hours. Alternately, drying can be effected by exposing the coated sheet to a temperature of 350° F. to 400° F. for about 30 to about 300 seconds.

The resinous compound of the seal coat is preferably a vinyl resin. Suitable resins are commercially available in the form of aqueous dispersions containing from 40 to 50 percent solids, and vinyl resin plastisols and organosols. The dispersion can contain, in addition to the plasticizer, resin, pigment and filler, conventional wetting agents, thickening agents, anti-foam agents, sequestering agents and alkali. Suitable wetting agents include the sodium salt of polymerized alkyl aryl sulfonic acid, potassium oleate, alkyl aryl polyether sulfonate, resin acid soap and the like. Ammonium caseinate, borated casein, methyl cellulose, carboxymethyl cellulose, hydroxyethyl cellulose and the like are satisfactory thickening agents. Examples of suitable anti-foam agents are pine oil and silicone anti-foam agents, diglycol laurate, and octyl alcohol. Suitable sequestering agents include tetrasodium pyrophosphate and the tetrasodium salt of ethylenediamine tetra-acetic acid. The alkali provides a pH of about 7.0 so that there will be no tendency for the latex to coagulate. Calcium hydroxide, sodium hydroxide, ammonia and potassium hydroxide are suitable alkalis for this purpose.

Normally, the pigments and fillers are ground with water in the presence of wetting agents, thickening agents and the like and the pigment dispersion is mixed with the vinyl resin and plasticizer later. Alternately, the seal coat can be effectively applied in the form of a solution using, for example, a solvent such as toluene or methyl ethyl ketone. However, the cost of using solvent and the fire and health hazards created by its use render the method undesirable.

The seal coat can contain stabilizers to retard the decomposition of the vinyl resin and increase the life of the product, such as sulfides and sulfites of aluminum, silver, calcium, cadmium, barium, sodium, magnesium, strontium; lead and tin stearates; oleates and other complexes; glycerine, leucine, alanine, o- and p-aminobenzoic and sulfanilic acids, hexamethylene tetramine, salts including phosphates, stearates, palmitates, oleates, ricinoleates, abietates, laurates, salicylates; and the like.

As stated hereinabove, the resin component of the seal coat is preferably a vinyl resin, that is, a polymeric material obtained by polymerizing compounds containing at least one —$CH\!=\!CH_2$ radical. Useful vinyl resins include homopolymers, such as polyvinyl chloride, polyvinyl acetate, polyvinyl propionate, polyvinyl butyrate, polymerized vinylidene chloride, polymerized acrylic acid, polymerized ethyl acrylate, polymerized methyl acrylate, polymerized propyl acrylate, polymerized butyl acrylate, and the like; copolymers of the above with each other such as vinyl chloride-vinyl acetate copolymer, vinylidene chloride-vinyl chloride copolymer, methyl methacrylate-vinyl chloride copolymer, methyl acrylate-ethyl acrylate copolymer, ethyl acrylate-butyl acrylate copolymer, and the like and copolymers of the above with other monomers copolymerizable therewith, such as vinyl esters, including vinyl bromide, vinyl fluoride, vinyl choroacetate, vinyl alkyl sulfonates, trichloroethylene and the like; vinyl ethers such as vinyl ethyl ether, vinyl isopropyl ether, vinyl chloroethyl ether and the like; cyclic unsaturated compounds such as styrene, chlorostyrene, coumarone, vinyl pyridine and the like; maleic and fumaric acid and their derivatives such as diethyl maleate, dibutyl fumarate and the like; unsaturated hydrocarbon such as ethylene, propylene, butylene and the like; allyl compounds such as allyl acetate, allyl chloride, allyl ethyl ether, and the like; conjugated and cross-conjugated unsaturated compounds such as butadiene, isoprene, chloroprene, 2,3-dimethylbutadiene-1,3, divinyl ketone and the like. The monomers listed hereinabove are useful in preparing copolymers with a vinyl resin and can be used as modifiers in the polymerization, in which case they may be present in an amount of a few percent, or they can be used in larger quantities, up to as high as 40 percent by weight of the mixture to be polymerized. If desired, a mixture of vinyl resins can be used in preparing coating paints for use in the invention.

A plasticizer for the vinyl resin is also frequently present in the seal coat composition. Suitable plasticizers for the vinyl resin include ester type plasticizers such as tributyl phosphate, dioctyl phthalate, dipropylene glycol dibenzoate, phenyl phosphate, dibutyl tartrate, amyl tartrate, butyl benzyl benzoate, dibutyl sebacate, dioctyl adipate, didecyl adipate and the like, rubbery plasticizers, such as butadiene-styrene copolymer, butadiene-acrylonitrile copolymer, and the like, and other materials which function as plasticizers, such as epoxidized drying oils, aromatic hydrocarbon condensates and the like. Where certain flexible soft vinyl resins are used in formulating the seal coat, such as polymers containing large proportions of ethyl acrylate, no plasticizer is needed. However, in most instances, a plasticizer is essential in order to impart the necessary properties of flexibility to the dried seal coat film. The seal coat must be compatible with the subsequently applied layer.

Likewise, plastisol or organosol dispersions of vinyl resins can be utilized for seal coats on one or both surfaces of substrate 11.

The thickness of the relatively flat, fibrous substrate 11 will depend to a large extent upon the particular product to be made and the particular subsequent use for which it is intended. Normally, a thickness in the range of from about 10 mils to about 90 mils is satisfactory.

The substrate 11 of FIGS. 1 and 2 and substrate element 21 of FIG. 3 may also be a thin sheet or mat of glass fibers that is saturated or completely coated with a heat-cured polyvinyl chloride plastisol or organosol. Glass fiber mats are readily available and are disclosed in, for example, U.S. Pat. Nos. 3,980,511; 4,018,647 and 4,234,379, including also German Patent Publication OS No. 2,605,879, and the many patents that are described in the aforementioned patents.

THE VINYL PLASTISOL ADHESIVE COMPOSITION

The substrate 11 (as shown in FIG. 1) is coated with a suitable vinyl plastisol composition to provide layer 12 thereon. In the alternative embodiment of FIG. 2, a printed image 15 is shown on substrate 11. In this construction, the vinyl plastisol layer 12 is applied so as to extend over the printed image 15.

The printed image 15 may be applied to the seal coat on substrate 11. Printing is conventional and paints and inks normally used for aplication of a decorative design to a vinyl film or layer are used. The composition is preferably formulated so that the binder of the ink contains an appreciable quantity of a vinyl resin. Suitable vinyl resins include vinyl chloride polymer, vinyl chloride-vinyl acetate copolymer, vinyl chloride-vinyl propionate copolymer, vinyl butyrate polymer, vinylidene chloride polymer, vinylidene chloride-vinyl chloride copolymer, copolymers of vinyl chloride and vinylidene chloride with esters of maleic and fumaric acid, such as dimethyl, diethyl, and dibutyl maleate and fumarate, and the like. Extender resins, such as nitrocellulose, or acrylic polymers, can be employed as a portion of the binder of the ink or paint.

The decorative printing composition may contain pigments according to the colors desired and may be preferably formulated as a solution in the solvent such as cyclohexanone, methyl ethyl ketone, methyl isobutyl ketone and the like. The decorative printing composition can be applied to the seal coated surface of the sheet or substrate in any way appropriate for producing the particular decoration desired. Any of the rotary graphic art printing processes, such as rotogravure, offset printing or lithography, can be used. If desired, the design can be applied by conventional block printing technique.

The procedure for applying vinyl plastisol layer 12 is conventional and requires no further description, inasmuch as such procedures are well known in the industry and are described in many publications and patents. Layer 12 of vinyl plastisol is approximately 3 to 4 mils thick, although any desirable thickness may be utilized. Layer 12 is preferably applied to substrate 11 by means of any conventional applicator device, such as, for example a rotary screen/blade coating device.

APPLICATION OF PVC RESIN PARTICLES TO THE SUBSTRATE

Particles 13 of polyvinyl chloride (PVC) resin are applied to the vinyl plastisol of layer 12 preferably by flooding the entire layer 12 on substrate 11 with the PVC resin particles. The PVC resin particles 13 adhere to the vinyl plastisol of layer 12, and the excess PVC resin particles 13 that do not adhere to the vinyl plastisol of layer 12 are removed by appropriate means, e.g., air knife, vacuum or suction techniques and devices.

The PVC resin particles 13 utilized for making the decorative laminate of the invention must be characterized by two essential features, namely, particle size and plasticizer absorption properties. Specifically, the PVC resin particles 13 must have a particle size diameter of between about 4 mils and about 20 mils with, preferably, an average particle size diameter of between about 8 and about 12 mils.

Also, the PVC resin particles 13 must be classified as a Type GP resin (as specified in Table 1 of ASTM-D-1755) and is characterized by a plasticizer absorption greater than about 40 grams per 100 grams of PVC resin (as measured by ASTM-D-3367, modified to allow a standing time of 5 minutes instead of the 15 minutes specified in paragraph 7.6 of the ASTM procedure). Satisfactory results in terms of differential gloss and differential texture have been achieved using G P resins having a cell classification number of 4 (ASTM-D-1755).

PVC resin particles 13 having the foregoing particle size and plasticizer absorption properties are necessary in order to obtain the desired differential gloss and differential texture features of the decorative laminate of the present invention. Satisfactory results have been obtained using a particulate PVC resin sold under the tradename designation "Geon 92" by the B. F. Goodrich Chemical Company, Inc., Cleveland, Ohio. Particulate PVC resins that have not provided the desired differential gloss and differential texture properties include blending resins such a TENNECO 501 and Goodyear Pliovic M-70, and dispersion PVC resins such as TENNECO 1732 and TENNECO 1755.

The PVC resin particles 13 can be either clear, i.e. uncolored, or colored. Suitably colored PVC resin particles 16 can be obtained by mixing clear PVC resin particles with dry opaque pigments with a suitable amount of plasticizer. The concentration of opaque pigment utilized should not be so high as to adversely affect the absorption property of the PVC resin particles, since otherwise, the absorption property of the PVC resin particles and the desired differential texture and differential gloss effect of the ultimate decorative laminate product is not obtained. Use of too large a quantity of plasticizer should be avoided when preparing colored PVC resin particles 13. Large quantities of plasticizer adversely affect the desired differential texture and differential gloss visual features of the finished laminate product (e.g., the finished laminate product will result in less surface texture and higher gloss). For example, the quantity of primary plasticizer which can be added to the PVC resin, such as Geon 92 as in Example 1 should be less than about 30 phr.

HEATING PLASTISOL LAYER TO ADHERE PVC RESIN PARTICLES THERETO

The substrate 11 having PVC resin particles 13 adhered to the vinyl plastisol of layer 12 is heated by conventional means, e.g., in a convection oven or by radiant heaters, to gel the plastisol and firmly adhere the PVC resin particles thereto. Care must be exercised to avoid overheating the vinyl plastisol of layer 12 during the gelling sequence, since otherwise the PVC resin particles 13 will absorb the vinyl plastisol of layer 12 and not produce the desired differential gloss and differential texture effect in the final product. A suitable heating range is between about 250° F. and about 450° F., preferably 300° F.

TOP LAYER OF TRANSPARENT SYNTHETIC ORGANIC POLYMER

The substrate 11 having PVC resin particles 13 positioned thereon and adhered thereto is coated with a top layer 14 of transparent, synthetic organic polymeric material such as, for example, a polyvinyl chloride (PVC) plastisol. Preferably, the transparent PVC plastisol has a viscosity of about 1000 centipoises and is applied to the intermediate laminate by means of a blotch rotary screen equipped with a blade squeegee. Suitable results have been obtained with plastisols having a viscosity ranging between about 350 and about 1250 centipoises. The combination of a blotch rotary screen printer/blade coating device has provided good results to date, but other combinations of coating equipment or techniques, such as, for example, a blade-over-roll, air knife, reverse roll or roller-type squeegee and rotary screen coating techniques are satisfactory.

Use of plastisols having a viscosity much greater than about 1500 centipoises is not recommended because the necessary quantity of the plastisol is difficult to control. Also, such plastisols have inadequate flow properties around and into the PVC resin particles 13. As a result, the desired differential gloss and differential texture features are not obtained in the final product.

The top layer 14 of the PVC plastisol extends over the entire surface of the intermediate decorative laminate so as to overlie the PVC resin particles 13 on the substrate 11. Use of a rotary screen applicator that is equipped with a blade squeegee device permits achievement of a thin, uniform PVC plastisol coating on the PVC resin particles which thoroughly saturates the region containing the PVC resin particles.

FUSING THE TOP RESINOUS COMPOSITION

After the top layer 14 of resinous plastisol composition has been applied over the entire upper surface of the intermediate decorative laminate, it is heated by conventional means, e.g., in a convection oven or by radiant energy, at an elevated temperature to fuse the entire product and provide a product of unitary construction. Suitable temperatures for heating top layer 14 include a range of between about 350° F. and about 500° F., preferably 400° F.

EMBOSSING THE DECORATIVE LAMINATE

Following the fusion step described above, the intermediate decorative laminate is embossed to impart thereto the unique surface features of differential gloss and differential texture that are characteristic of the product of the invention.

Specifically, the intermediate decorative laminate is mechanically embossed in either a sequential or continuous manner by utilizing any of known techniques, e.g., such as a flat bed press or cylindrical embossing rolls. The embossing plate or roll is impressed upon the surface of the intermediate laminate in the usual manner so that the design on the embossing plate or roll is transmitted to the intermediate decorative laminate. In this manner, the lands and valleys on the embossing plate or roll provide the valleys and lands, respectively, on the final embossed decorative laminate.

The embossing step is performed while the intermediate decorative laminate is at a temperature preferably greater than about 220° F. When conducted at this temperature, the lands of the embossing plate or roll press into the surface of the intermediate decorative laminate and effect a consolidation of the PVC resin particles in this region of the laminate by heating and melting the PVC resin particles which are thereby caused to unite by melt flow with the vinyl plastisol adhesive therebeneath (original layer 12) and the top layer of PVC plastisol (original top layer 14). The foregoing consolidation results in a transparent or clear region that is both smooth and glossy, as depicted by reference numeral 18 of FIG. 1.

The valley regions of the embossing plate or roll are preferably sufficiently deep so as to preclude contact of these regions with the surface of the intermediate decorative laminate during the embossing operation. In this manner, the low gloss and rougher surface profile or texture of the corresponding raised regions of the intermediate laminate, such as regions 17 of FIG. 1, are maintained or retained.

Thus, the design of the embossing plate or roll, as well as the pressure conditions for conducting the embossing operation, can be readily selected to impart varying degrees of consolidation and flow of the PVC resin particles of the intermediate decorative laminate thereby to influence or control the degree of gloss and surface texture of the finished decorative laminate.

As shown in FIGS. 1, 2 and 3, the resulting fused, decorative laminate is characterized by unique surface features comprising raised segments or regions 17 that exhibit a rougher surface texture and have a low gloss, and recessed segments or regions 18 that are smooth and have a high gloss. Also, the surface regions 17 that contain the PVC resin particles 13 have a greater thickness than regions 18 thereby creating an embossed effect. Notably, the embossed effect of the decorative laminate is achieved in a direct and expeditious manner without employing extraordinary or additional measures beyond usual mechanical embossing treatments. If desired, enhanced embossing effects can be achieved by utilizing both conventional chemical and mechanical embossing techniques.

The surface texture of raised regions 17 is characterized by a surface profile of at least 50 micro-inches, root mean square (rms) and, preferably, between about 80 and about 1000 micro-inches (rms). The gloss of textured raised regions 17 is characterized by a Gardner 60° gloss of less than about 30 gloss units, preferably below about 10 gloss units. In contrast, the smooth and high gloss recessed regions 18 are characterized by a Gardner 60° gloss of greater than 30 gloss units, preferably between about 50 and about 100 gloss units, and most preferably about 80 gloss units.

THE EMBODIMENT OF FIG. 3

The embodiment of the decorative laminate of the invention shown in FIG. 3 is substantially the same as shown in FIGS. 1 and 2, except that the substrate layer 20 is of composite construction. Specifically, substrate layer 20 comprises a base member 21 of the same material as base member 11 of FIG. 1, and a base member 22 adhered to base member 21. Base member 22 is of foamed resinous polymer such as blown or foamed polyvinyl chloride.

The present invention is illustrated and described further in the following Examples which are merely exemplary and which show typical preferred embodiments thereof. All parts and percentages in the following Examples are by weight, unless otherwise specified.

The gloss and surface profile characteristics of the textured regions of the decorative laminates of the Examples were determined in accordance with the following procedures:

Gloss measurement was obtained using a Gardner, Multi-Angle Glossmeter, Model No. GG9095 of Gardner Lab, Inc., Bethesda, Md., set at a 60° angle.

Patterns were selected to produce textured PVC particulate containing regions and smooth regions larger than 4"×4" squares in order to obtain 60° gloss readings on each region independently.

Profile or surface topography of the raised, PVC particulate containing regions was characterized using a "Profilometer," Micrometrical Manufacturing Company, Ann Arbor, Mich. The instrument was equipped with a 0.0005 in radius diamond stylus and provided a direct readout in RMS (root mean square surface roughness) units that was an average value obtained over a 0.030 inch scan of the sample. The "Profilometer" was calibrated using a Stylus Radial Check standard of 9-13 RMS made by Bendix Corporation, Automation & Measurement Division.

The samples were scanned at a rate of 0.1 inch per second and the average RMS value per inch sample scanned are reported in the Examples.

EXAMPLE 1

This example illustrates the decorative laminate of FIG. 3.

A foamable plastisol composition having the following formulation:

| Formulation A | phr |
|---|---|
| Vinyl chloride dispersion resin (Firestone FPC 605) | 72 |
| Vinyl chloride blending resin (Goodyear Pliovic M70) | 28 |
| Primary plasticizer (DOP) | 45 |
| Epoxy stabilizer (Drapex 4.4) | 1.0 |
| Zinc octoate | 1.4 |
| ABFA blowing agent (Azo-bis formamide) Kempore AF | 2.5 | was applied to a thickness of 8 mils onto an 0.032 inch gauge (thick) flooring felt backing and gelled at 320° F. for 1 minute in an air impingement oven.

Thereafter, an image was rotogravure printed onto the above foamable plastisol layer.

Next, a transparent PVC plastisol layer of 5 mils thickness of the following formulation:

| Formulation B | phr |
|---|---|
| Vinyl chloride dispersion resin (Tenneco (1755) | 90 |
| Vinyl chloride blending resin (Borden 260 SS) | 10 |
| Primary plasticizer (DOP) | 25 |
| Secondary plasticizer (TXIB-Texanol iso-butyrate) | 17 |
| Epoxy stabilizer (Drapex 4.4) | 3 |
| Tin stabilizer (Mark 275) | 1 | was applied by means of a rotary screen/blade coater over the entire surface of the foamable plastisol layer including the printed image thereon.

The resultant plastisol layer was then flooded with Geon 92 PVC resin. The Geon 92 vinyl resin adhered to the plastisol layer and any excess resin was removed by dumping. The composite was subsequently gelled as described above.

The resultant gelled composite was then overall clear coated using a blotch rotary screen/blade coater. A thin, uniform plastisol coating of Formulation B above was applied on the surface of the Geon PVC particles.

The resultant composite structure was fused and expanded at 400° F. to provide an intermediate laminate having an overall low-gloss, textured surface.

The above intermediate laminate was mechanically embossed before cooling and in register with selected portions of the rotogravure printed design thereon by contacting the surface of the intermediate laminate with a patterned, magnesium embossing plate having an embossing depth of 60 mils in a flat-bed Birdsboro press under the following conditions:

| | |
|---|---|
| Top platen (embossing plate) temperature | 310° F. |
| Bottom platen temperature | 85° F. |
| Embossing pressure | 75 psi |
| Dwell time | 1.5 min. |

After cooling, the resultant decorative laminate had a relief pattern on the surface thereof comprising (1) recessed regions having a smooth surface, good clarity and a Gardner 60° gloss of 80 units, and (2) raised regions having a textured surface, a Gardner 60° gloss of about 3 units and a surface profile of 50–180 microinches (root mean square)—the average surface profile was 115 microinches.

What is claimed is:

1. A decorative laminate having an embossed surface of differential texture and differential gloss suitable as a floor covering comprising
    a substrate;
    PVC resin particles of type GP PVC resin adhered to said substrate so constructed and arranged as to provide raised segments containing said PVC resin particles adjoining recessed segments which do not contain said PVC resin particles whereby said raised and recessed segments impart a relief pattern on the surface of said decorative laminate; and
    a layer of transparent synthetic organic polymer adhered to the surface of said raised segments and said recessed segments;
whereby the raised segments of said decorative laminate exhibit a rougher surface texture and a lower gloss than the recessed segments of said decorative laminate.

2. The decorative laminate of claim 1 wherein the recessed segments of said laminate have a Gardner 60° gloss greater than about 30.

3. The decorative laminate of claim 2 wherein the textured raised segments of said laminate have a surface profile of at least 50 micro-inches (rms).

4. The decorative laminate of claim 2 wherein said PVC resin particles have a particle size diameter between about 4 mils and about 20 mils.

5. The decorative laminate of claim 4 wherein said PVC resin particles have a cell classification number of 4.

6. The decorative laminate of claim 5 wherein said PVC resin particles have a plasticizer absorption greater than about 40.

7. The decorative laminate of claim 6 wherein said PVC resin particles are pigmented.

8. The decorative laminate of claim 7 wherein said layer of transparent synthetic organic polymer is polyvinyl chloride.

9. The decorative laminate of claim 1 wherein said substrate comprises a flexible base member and a layer of a foamed polyvinyl chloride resin bonded to at least one surface of said flexible base member.

10. The decorative laminate of claim 9 wherein said flexible base member is a resin-impregnated web of felted fibers.

11. The decorative laminate of claim 10 wherein the recessed segments of said laminate have a Gardner 60° gloss greater than about 30.

12. The decorative laminate of claim 11 wherein the textured raised segments of said laminate have a surface profile of at least 50 micro-inches (rms).

13. The decorative laminate of claim 11 wherein said PVC resin particles have a particle size diameter between about 4 mils and about 20 mils.

14. The decorative laminate of claim 13 wherein said PVC resin particles have a cell classification number of 4.

15. The decorative laminate of claim 14 wherein said PVC resin particles have a plasticizer absorption greater than about 40.

16. The decorative laminate of claim 15 wherein said PVC resin particles are pigmented.

17. The decorative laminate of claim 16 wherein said layer of transparent synthetic organic polymer is polyvinyl chloride.

18. A decorative laminate having an embossed surface of differential surface texture and differential gloss suitable as a floor covering comprising
    a substrate having a printed image thereon;
    a first layer of PVC polymer overlying said printed image;
    PVC resin particles of type GP PVC resin adhered to said first layer of PVC polymer so constructed and arranged as to provide raised segments containing said PVC resin particles adjoining recessed segments which do not contain said PVC resin particles whereby said raised and recessed segments impart a relief pattern on the surface of said decorative laminate; and
    a second layer of transparent PVC polymer adhered to the surface of said raised segments and said recessed segments;
whereby the raised segments of said decorative laminate overlying said PVC resin particles exhibit a rougher surface texture and a lower gloss than the recessed segments of a said decorative laminate.

19. The decorative laminate of claim 18 wherein the recessed segments of said laminate have a Gardner 60° gloss greater than about 30.

20. The decorative laminate of claim 19 wherein the textured raised segments of said laminate have a surface profile of at least 50 micro-inches (rms).

21. The decorative laminate of claim 19 wherein said PVC resin particles have a particle size diameter between about 4 mils and about 20 mils.

22. The decorative laminate of claim 21 wherein said PVC resin particles have a cell classification number of 4.

23. The decorative laminate of claim 22 wherein said PVC resin particles have a plasticizer absorption greater than about 40.

24. The decorative laminate of claim 23 wherein said PVC resin particles are pigmented.

25. The decorative laminate of claim 18 wherein said substrate comprises a flexible base member and a layer of a foamed polyvinyl chloride resin bonded to at least one surface of said flexible base member.

26. The decorative laminate of claim 25 wherein said flexible base member is a resin-impregnated web of felted fibers.

27. The decorative laminate of claim 26 wherein the recessed segments of said laminate have a Gardner 60° gloss greater than about 30.

28. The decorative laminate of claim 27 wherein the textured raised segments of said laminate have a surface profile of at least 50 micro-inches (rms).

29. The decorative laminate of claim 27 wherein said PVC resin particles have a particle size diameter between about 4 mils and about 20 mils.

30. The decorative laminate of claim 29 wherein said PVC resin particles have a cell classification number of 4.

31. The decorative laminate of claim 30 wherein said PVC resin particles have a plasticizer absorption greater than about 40.

32. The decorative laminate of claim 31 wherein said PVC resin particles are pigmented.

* * * * *